US009780422B2

(12) United States Patent
Dunn et al.

(10) Patent No.: US 9,780,422 B2
(45) Date of Patent: Oct. 3, 2017

(54) CABIN AND BATTERY COOLING CONTROL FOR ELECTRIFIED VEHICLES

(71) Applicant: Ford Global Technologies, LLC, Dearborn, MI (US)

(72) Inventors: Brett Allen Dunn, Plymouth, MI (US); Angel Fernando Porras, Dearborn, MI (US); Mark G. Smith, Canton, MI (US); Timothy Noah Blatchley, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 236 days.

(21) Appl. No.: 14/716,933

(22) Filed: May 20, 2015

(65) Prior Publication Data

US 2016/0339760 A1 Nov. 24, 2016

(51) Int. Cl.
*B60H 1/00* (2006.01)
*H01M 10/663* (2014.01)
*B60H 1/32* (2006.01)
*H01M 10/625* (2014.01)

(52) U.S. Cl.
CPC ...... *H01M 10/663* (2015.04); *B60H 1/00278* (2013.01); *B60H 1/00385* (2013.01); *B60H 1/3205* (2013.01); *B60H 1/3208* (2013.01); *H01M 10/625* (2015.04); *B60H 2001/00307* (2013.01); *B60H 2001/3266* (2013.01); *B60H 2001/3272* (2013.01)

(58) Field of Classification Search
CPC .............. H01M 10/663; H01M 10/625; B60H 1/00278; B60H 1/00385; B60H 1/3205; B60H 1/3208; B60H 2001/00307; B60H 2001/3266; B60H 2001/3272
USPC .......................................................... 165/202
See application file for complete search history.

(56) References Cited

U.S. PATENT DOCUMENTS

| 5,306,116 A | 4/1994 | Gunn et al. |
| 8,793,003 B2 | 7/2014 | Laughman et al. |
| 8,840,358 B2 | 9/2014 | Huis In Het Veld |
| 2008/0034767 A1 | 2/2008 | Ziehr et al. |
| 2008/0307811 A1 | 12/2008 | Bryan et al. |
| 2012/0297809 A1* | 11/2012 | Carpenter ............... B60L 1/003 62/244 |
| 2014/0303805 A1 | 10/2014 | Zhou et al. |
| 2016/0031340 A1* | 2/2016 | Porras ................. H01M 10/613 701/22 |
| 2016/0221413 A1* | 8/2016 | Gebbie .............. B60H 1/00921 |

* cited by examiner

*Primary Examiner* — Justin Jonaitis
(74) *Attorney, Agent, or Firm* — David B. Kelley; Brooks Kushman P.C.

(57) ABSTRACT

A vehicle includes a battery arrangement, a chiller, a coolant circuit configured to direct coolant through the chiller and battery arrangement, a refrigerant circuit including a compressor, valve, and evaporator, and a controller. The controller is programmed to alter a speed of the compressor and a position of the valve based on a pressure and temperature of refrigerant output from the chiller to alter a temperature of the coolant.

13 Claims, 5 Drawing Sheets

CABIN AND BATTERY COOLING CONTROL FOR ELECTRIFIED VEHICLES

TECHNICAL FIELD

This disclosure relates to cabin and battery cooling systems for electrified vehicles.

BACKGROUND

Hybrid electric vehicles and electric vehicles use a motor to propel the vehicle. Power is supplied to the motor by a battery. The battery is configured to store an electrical charge that may also be used to power other vehicle components. Efficient use of the battery allows the vehicle to be propelled by the motor. This may be achieved by using a cooling arrangement. Propelling the vehicle using a motor, powered by the battery, reduces the necessity of the vehicle to operate using an internal combustion engine. Reducing operation of the internal combustion engine increases fuel economy of the vehicle.

SUMMARY

A climate control system includes a traction battery arrangement, a cooling system, and a controller. The cooling system includes a chiller, an evaporator, a first conduit and first valving arranged to selectively form a coolant circuit incorporating the chiller to cool the traction battery arrangement, and a second conduit and second valving arranged to selectively form a first refrigerant circuit incorporating the chiller and the evaporator or a second refrigerant circuit bypassing the chiller and incorporating the evaporator based on an activation state of the second valving, and a compressor configured to move fluid through the refrigerant circuits. The controller is configured to, in response to a request for cabin cooling received while fluid is moving through at least one of the refrigerant circuits, adjust a speed of the compressor to change cabin cooling and alter the activation state of the second valving to change cooling of the traction battery arrangement.

A climate control method for a vehicle including a coolant circuit configured to direct coolant through a chiller and battery arrangement, and a refrigerant circuit including a compressor, valve, and evaporator, includes the step of altering a speed of the compressor and position of the valve based on a pressure and temperature of refrigerant output from the chiller to drive a temperature of the refrigerant toward a superheat value of the refrigerant and to change a coolant temperature.

A vehicle includes a battery arrangement, a chiller, a coolant circuit configured to direct coolant through the chiller and battery arrangement, a refrigerant circuit including a compressor, valve, and evaporator, and a controller. The controller is programmed to alter a speed of the compressor and a position of the valve based on a pressure and temperature of refrigerant output from the chiller to alter a temperature of the coolant.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
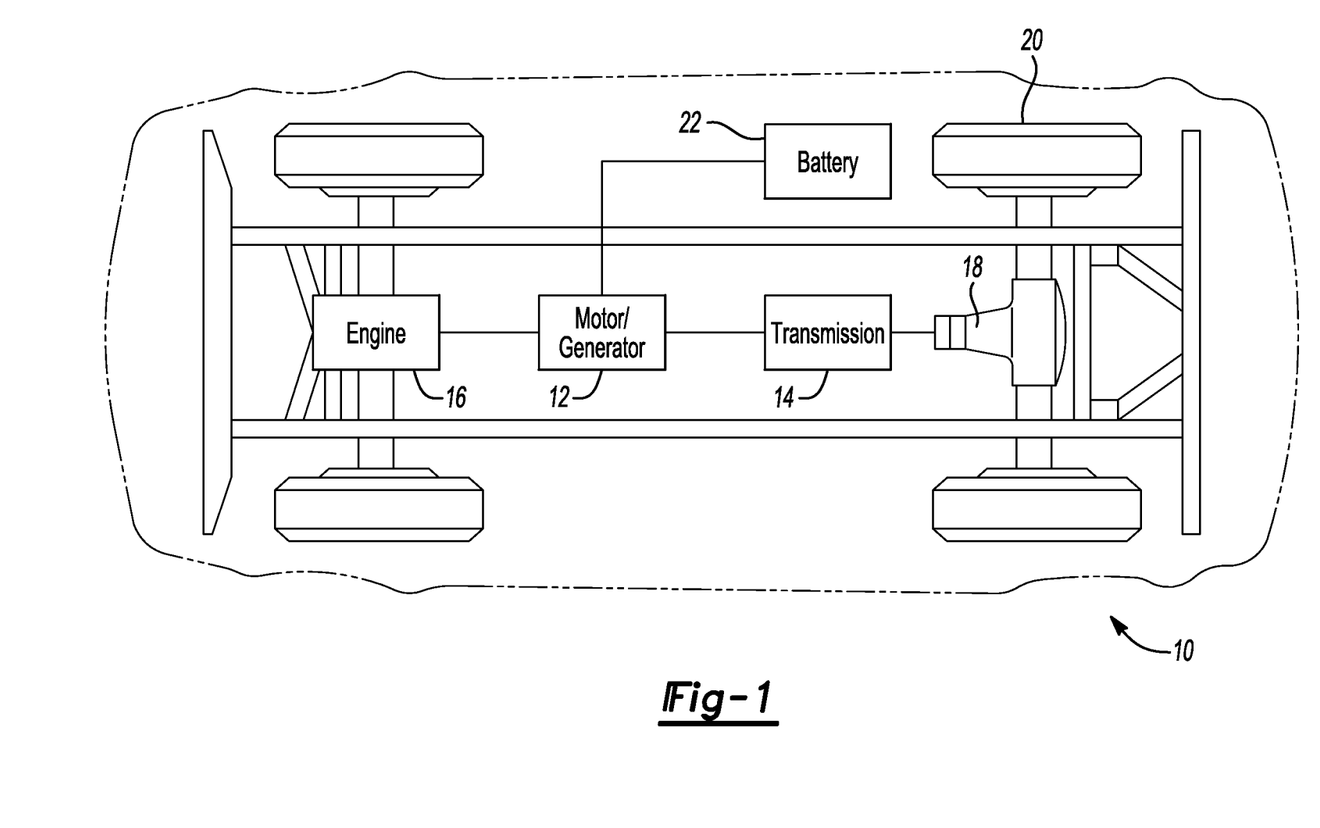
FIG. 1 is a schematic view of an electric vehicle.

FIG. 1 depicts a schematic of a typical hybrid-electric vehicle 10. Certain embodiments, however, may also be implemented within the context of plug-in hybrids and fully electric vehicles. The vehicle 10 includes one or more electric machines 12 mechanically connected to a hybrid transmission 14. In at least one embodiment, a single electric machine 12 may be mechanically connected to the hybrid transmission 14. The electric machine 12 may be capable of operating as a motor or a generator. In addition, the hybrid transmission 14 may be mechanically connected to an engine 16. The hybrid transmission 14 may also be mechanically connected to a drive shaft 18 that is mechanically connected to the wheels 20. The electric machine 12 can provide propulsion through a drive shaft 18 to the wheels 20 and deceleration capability when the engine 16 is turned on or off. The electric machine 12 also acts as a generator and can provide fuel economy benefits by recovering energy through regenerative braking. The electric machine 12 reduces pollutant emissions and increase fuel economy by reducing the work load of the engine 16.

A traction battery or battery pack 22 stores energy that can be used by the electric machine 12. The traction battery 22 typically provides a high voltage direct current (DC) output from one or more battery cell arrays, sometimes referred to as battery cell stacks, within the traction battery 22. The battery cell arrays may include one or more battery cells.

Propulsion using the electric machine 12 requires power from the battery 22. Supplying power to the electric machine 12 causes the battery 22 to generate thermal energy. Charging the battery 22 may also cause the battery 22 to generate thermal energy. Thermal energy, in the form of heat, may degrade the charge stored within the battery 22. This reduces the length of time the vehicle 10 may be propelled using the electric machine 12. Therefore, it may be advantageous to cool the battery 22. Cooling the battery may dissipate thermal energy from the battery 22 and increase efficiency of the power transfer from the battery 22 to the electric machine 12. This would allow the electric machine to propel the vehicle 10 for a longer period of time and reduce a period of time the vehicle is propelled by the engine 16.

The various components discussed may have one or more associated controllers to control and monitor the operation of the components. The controllers may communicate via a serial bus (e.g., Controller Area Network (CAN)) or via dedicated electrical conduits.

Figure 2:
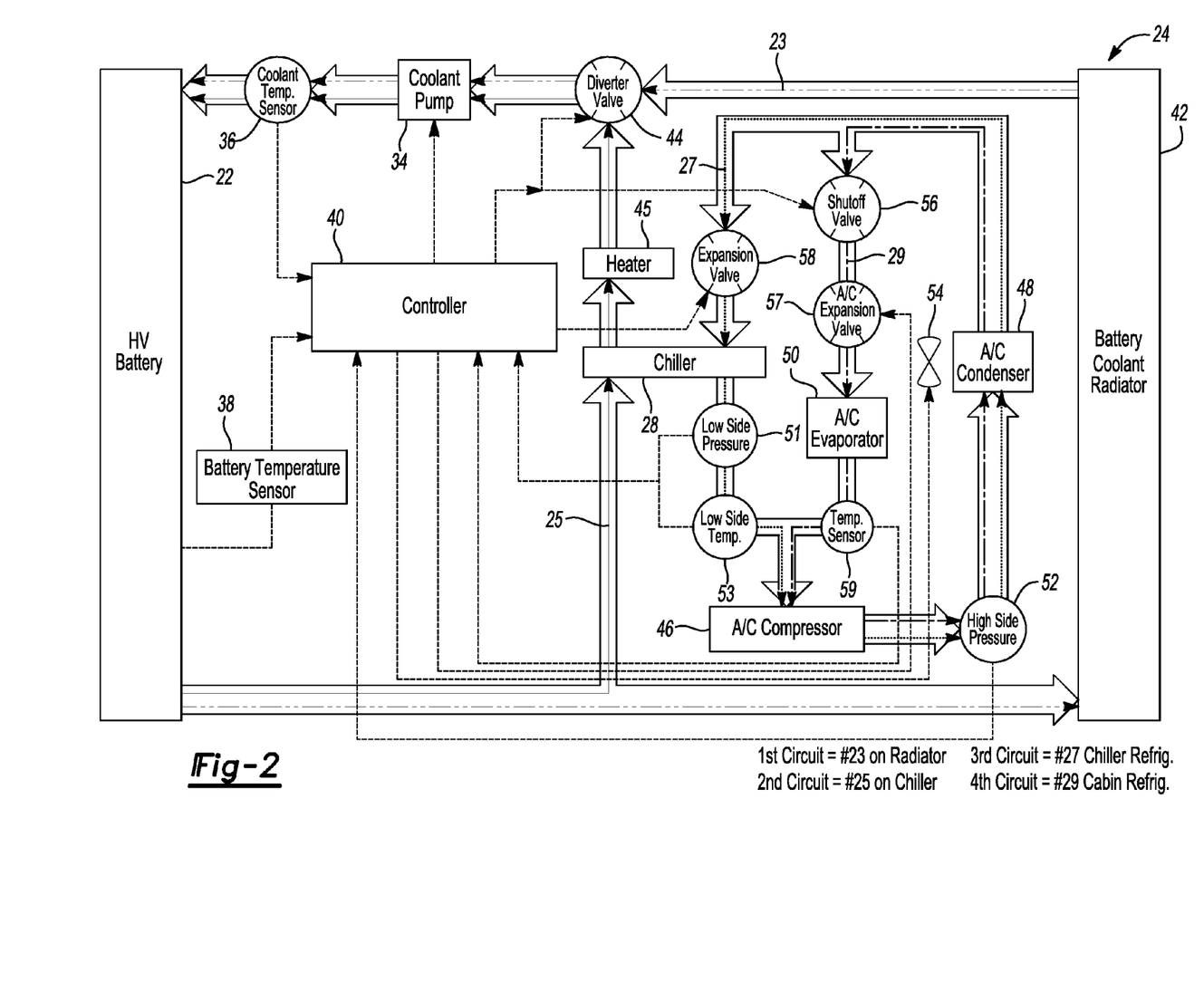
FIG. 2 is a fluid circuit diagram depicting flow of coolant through a battery chiller and cabin evaporator.

FIG. 2 depicts a fluid circuit diagram for a cooling system 24 used to cool the battery 22. The cooling system 24 uses a refrigerant and a coolant in different thermal circuits to optimize battery 22 performance. A first thermal circuit 23 and second thermal circuit 25 may be used to control the temperature of the coolant. A third thermal circuit 27 and fourth thermal circuit 29 may be used to control the temperature of a refrigerant. The third thermal circuit 27 may also be used to optimize the temperature of both the coolant and the refrigerant. The coolant may be a conventional coolant mixture, such as water and ethylene glycol. The refrigerant may be a conventional refrigerant, such as R134a or 1234yf. The third 27 and fourth 29 circuits could run simultaneously when cabin and battery thermal management is required.

The first thermal circuit 23 and the second thermal circuit 25 may include a coolant pump 34, the battery 22, a radiator 42, a chiller 28, and a diverter valve 44. The pump 34 is used to circulate the coolant through the first thermal circuit 23 and the second thermal circuit 25. The pump 34 pumps the coolant to the battery 22. The coolant may pass a coolant temperature sensor 36 before interacting with the battery 22 to monitor the temperature of the coolant. A battery temperature sensor 38 may be used to monitor the temperature of the battery 22.

A controller 40, or control module communicates with the coolant temperature sensor 36 and the battery temperature sensor 38 to optimally control the flow of the coolant through the first and second thermal circuits 23, 25 based on temperature demands of the battery 22. In at least one other embodiment, the controller may communicate with a plurality of temperature sensors 38. The coolant interacts with the battery 22 to absorb heat from the battery 22. The warmed coolant from the battery 22 is pumped into the radiator 42 through the first thermal circuit 23. The radiator 42 cools the warmed coolant using ambient air flowing across the radiator 42. The radiator 42 allows the coolant to dissipate the thermal energy absorbed from the battery 22 and be cycled back to the battery 22 for further cooling.

The diverter valve 44 may be used to regulate the flow of the coolant from the radiator 42. If an ambient temperature is above a predefined threshold value or battery temperature is above a predefined battery temperature threshold, then the radiator 42 may not provide sufficient cooling to the coolant to meet battery cooling demands. The diverter valve 44 may be actuated by the controller 40 to retard coolant flow from the radiator 42 when the ambient temperature is above the threshold. When actuated, the diverter valve 44 forces the coolant to be pumped by the pump 34 through the chiller 28 in the second thermal circuit 25. For example, after absorbing thermal energy from the battery 22 the coolant may also be cycled through the chiller 28 to sufficiently cool the coolant to meet battery cooling demands.

The third and fourth thermal circuits 27, 29 may include a compressor 46, a condenser 48, and an evaporator 50. The compressor 46 pressurizes and circulates the refrigerant through the third and fourth fluid circuits 27, 29. A pressure sensor 51 and temperature sensor 53 determine the pressure and temperature of the refrigerant necessary to measure a superheat value of the refrigerant. Another pressure sensor 52 may monitor a pressure of the refrigerant as it passes from the compressor 46 to the condenser 48 to determine a pressure ratio of the refrigerant based on the pressure from pressure sensor 51. The compressor 46 circulates the refrigerant to the condenser 48. The condenser 48 may include a fan 54. The condenser 48 is configured to condense the refrigerant from a gas to a liquid to further cool the refrigerant. If the refrigerant pressure is above a predefined threshold, then the controller 40 may activate the fan 54. The fan 54, in conjunction with grille shutters (not shown), aids to further dissipate thermal energy from the refrigerant.

The refrigerant may be circulated within the fourth thermal circuit 29 based on a demand from the evaporator 50. The condenser 48 in conjunction with the fan 54 aids to dissipate heat absorbed by the refrigerant in the fourth thermal circuit 29 to meet the demand of the evaporator 50. Before entering the evaporator 50, the refrigerant flows through a first expansion valve 57. The first expansion valve 57 may be an electronic expansion valve actively controlled by the controller 40. An additional temperature sensor 59 is used with the expansion vale 57 to regulate the flow of refrigerant through the evaporator 50. In at least one other embodiment, the first expansion valve 57 may be a passive thermal expansion valve. A refrigerant shut off valve 56 may be used to shut off refrigerant flow through the fourth thermal circuit 29. The refrigerant shut off valve 56 may also be used to allow refrigerant flow through the evaporator 50. When the refrigerant shut off valve allows refrigerant flow through the evaporator 50, refrigerant flows through both the third 27 and the fourth 29 thermal circuits provided that electric expansion valve 58 is open.

The third thermal circuit 27 may additionally include the chiller 28 and a second expansion valve 58. The chiller 28 may also be configured to effectuate a heat transfer of the refrigerant. The refrigerant shut off valve 56 only blocks refrigerant flow to the evaporator 50. To allow refrigerant flow through the chiller 28, only expansion valve 58 needs to open. The second expansion valve 58 may be an electronic expansion valve actively controlled by the controller 40. In at least one other embodiment, the second expansion valve 58 may be a passive thermal expansion valve. The second expansion valve 58 is configured to change the flow of the refrigerant based on the demand of the chiller 28. The refrigerant, passing through the chiller 28, transfers heat with the coolant to further aid to dissipate the thermal energy generated from operation of the battery 22.

The chiller 28 may also be in fluid connection with a heater 45. The heater 45 is configured to warm the coolant. This allows the thermal management system 24 to provide heating as well as cooling to the battery 22. The thermal management system 24 determines whether the battery 22 requires heating. If the battery 22 requires heating, the thermal management system 24 uses a plurality of heating levels to meet the demand from the battery 22.

When the coolant is pumped through the chiller 28 because the diverter valve 44 has been actuated, the refrigerant may aid to absorb thermal energy from the coolant in the chiller 28. This is consistent with an active cooling system. Active cooling via heat transfer from the coolant to the refrigerant allows further optimization of the battery temperature. Therefore, the third thermal circuit 27 incorporates the chiller 28 and the compressor 46 through the second expansion valve 58.

The controller 40 may implement control logic described below in order to optimize cooling within the chiller 28 and the evaporator 50. While schematically illustrated as a single module in the illustrated embodiment, the controller 40 may be part of a larger control system and may be controlled by various other controllers throughout the vehicle, such as but not limited to, a vehicle system controller that includes a battery energy control module.

Figure 3:
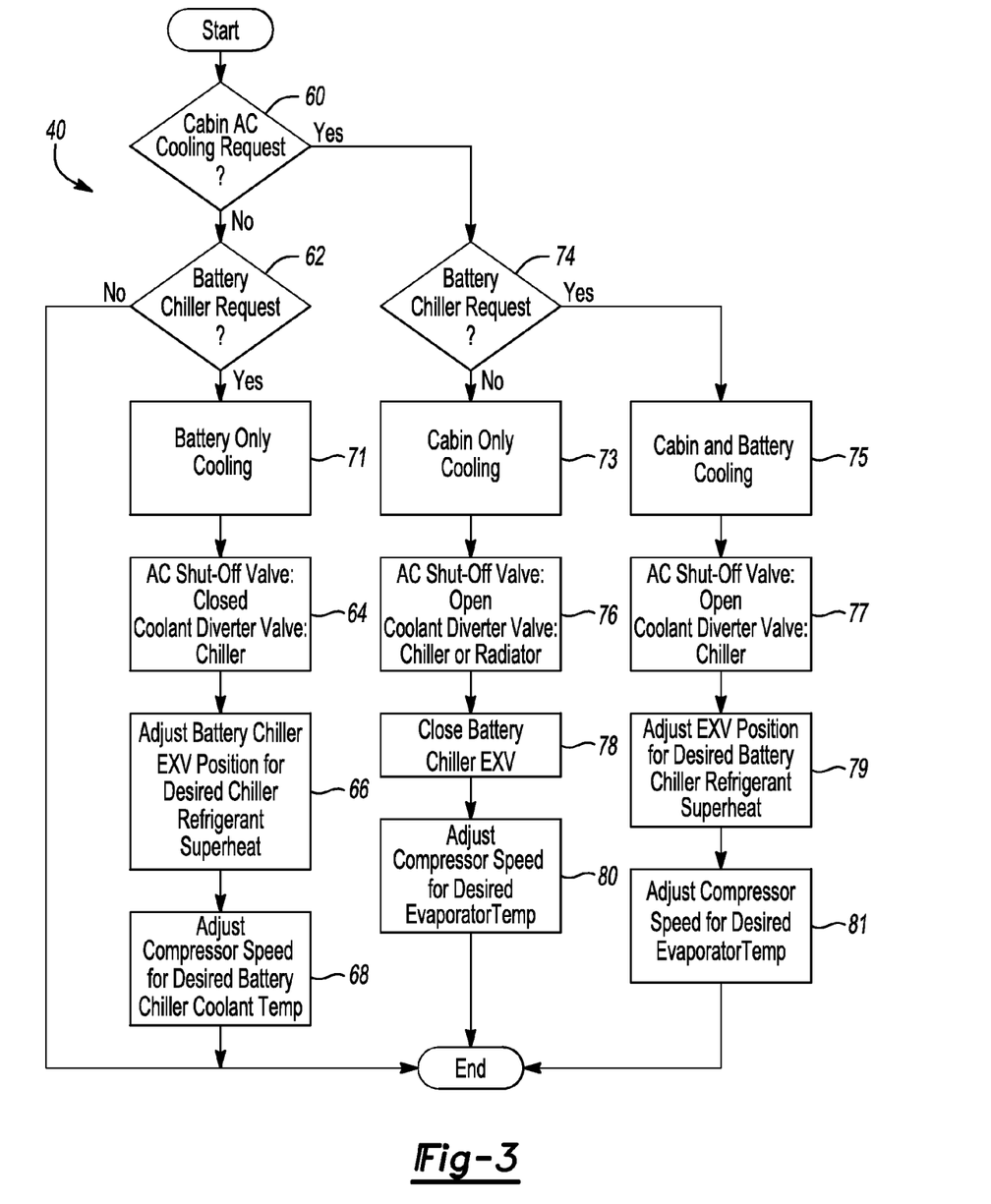
FIG. 3 is a control logic flow diagram depicting operation of the cooling system.

FIG. 3 depicts a control logic flow diagram depicting operation of the controller 40. At 60, the controller 40 determines if a request for cabin cooling is present. A request for cabin air conditioning cooling creates a demand for refrigerant to flow to the evaporator. If at 60 a request for cabin air conditioning cooling is not present, the controller 40 determines if a request for battery chiller cooling is present at 62. A request for battery chiller cooling creates a demand for coolant and refrigerant to flow through the chiller. If a request at 62 for battery chiller cooling is not present, the control logic ends. However, if at 62 a request for battery chiller cooling is present, the controller 40 may command a battery only cooling mode at 71, in which the controller 40 closes the diverter valve at 64. As stated above, the controller 40 closes the diverter valve at 64 when passive battery cooling using the radiator is not sufficient to meet the demand for battery cooling.

Closing the diverter valve at 64 causes the heat transfer described above between the coolant and the refrigerant. At 66 the controller 40 alters the position of the second expansion valve to provide sufficient refrigerant flow through the battery chiller to meet the desired chiller refrigerant outlet superheat. At 68 the controller 40 adjusts the speed of the compressor to optimize the flow of the refrigerant through the chiller to effectuate the desired heat transfer between the coolant and the refrigerant to achieve a target coolant temperature.

Referring back to 60, the controller 40 may receive a request for cabin cooling. If a request at 60 for cabin cooling is present, the controller 40 determines if a request for battery cooling through the chiller is present at 74. The determination at 74 may result in a cabin-only cooling mode at 73 or a cabin and battery cooling mode at 75. If at 74, a demand for battery cooling through the chiller is not present, the controller 40 may command the cabin-only cooling mode at 73, in which the controller 40 commands the shut-off valve to remain open and adjust the position of the diverter valve such that coolant flows to either the chiller or the radiator at 76. Adjusting the position of the diverter valve to allow coolant to flow to the chiller or radiator at 76 allows the coolant to flow through the radiator and passively cool the battery. Passive cooling of the battery may be advantageous due to the minimal power consumption needed to achieve battery cooling. The controller 40 may also command the second expansion valve to close at 78. Again, this is consistent with passive cooling of the battery. Passive battery cooling allows the controller 40 to meet the demand for cabin cooling at 60 by adjusting the compressor speed to achieve the desired evaporator temperature at 80.

If at 74, a request for battery cooling through the chiller is present, the controller may command the battery and cabin cooling mode at 75, in which the controller 40 commands the shut-off valve to remain open and adjust the position of the diverter valve such that coolant flows through the chiller at 77. The controller 40 also adjusts the electronic expansion valve to drive the battery chiller refrigerant superheat toward a desired value at 79, if a request for battery cooling through the chiller is present at 74. To achieve the cabin cooling request at 60, the controller may also adjust the compressor speed to reach a desired evaporator temperature at 81. The controller 40 allows for adequate cooling to reach the cabin as well as compensating for the demand for cooling to the battery. Therefore, the battery coolant pump and the diverter valve states are determined based on the thermal management system requirements.

Figure 4:
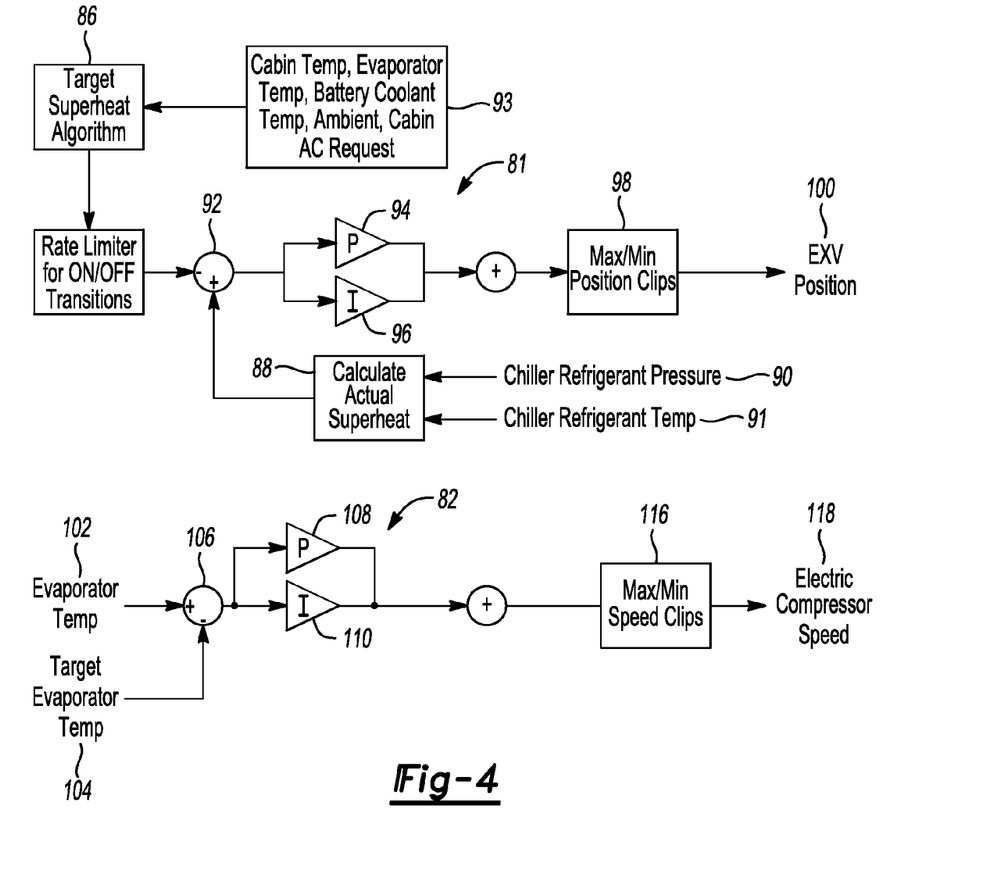
FIG. 4 is a control system diagram depicting operation of a chiller and evaporator control mode.

FIG. 4 depicts an expansion valve control system 81 for the second expansion valve and a compressor control system 82 for cooling demands to the chiller and evaporator. Control system 81 monitors superheat of the chiller to output a position of the second expansion valve. Control system 82 monitors evaporator temperature to output a compressor speed.

Control system 81 calculates a target superheat at 86 and an actual superheat at 88. The actual superheat at 88 is calculated through inputs from the chiller refrigerant pressure at 90 and the chiller refrigerant temperature at 91. The target superheat is calculated through inputs such as a cabin temperature, an evaporator temperature, a battery coolant temperature, an ambient temperature, and a cabin cooling request, at 93. The target superheat at 86 is subtracted from the actual superheat at 88 at 92. The result at 92 is run through a proportional gain at 94, as well as an integral gain at 96. The proportional gain at 94 is consistent with a short-term response to the comparison of the actual superheat at 88 and the target superheat at 86. The integral gain at 96 is consistent with a long-term response to the comparison of the actual superheat at 88 and target superheat at 86. The minimum and maximum position values based on the PI control at 94, 96 are clipped at 98. Based on the value generated at 98, the second expansion valve control system 81 outputs a second expansion valve position at 100.

The compressor control system 82 receives an actual evaporator temperature at 102 and a target evaporator temperature at 104. The target evaporator temperature at 104 is subtracted from the actual evaporator temperature at 102 at 106. The comparison of the target evaporator temperature at 104 and the actual evaporator temperature 102 are run through a proportional gain at 108 and an integral gain at 110. These values are similarly output and adjusted with the minimum and maximum compressor speed clips at 116. Using this calculation, the compressor control system 84 then outputs a compressor speed at 118.

Figure 5:
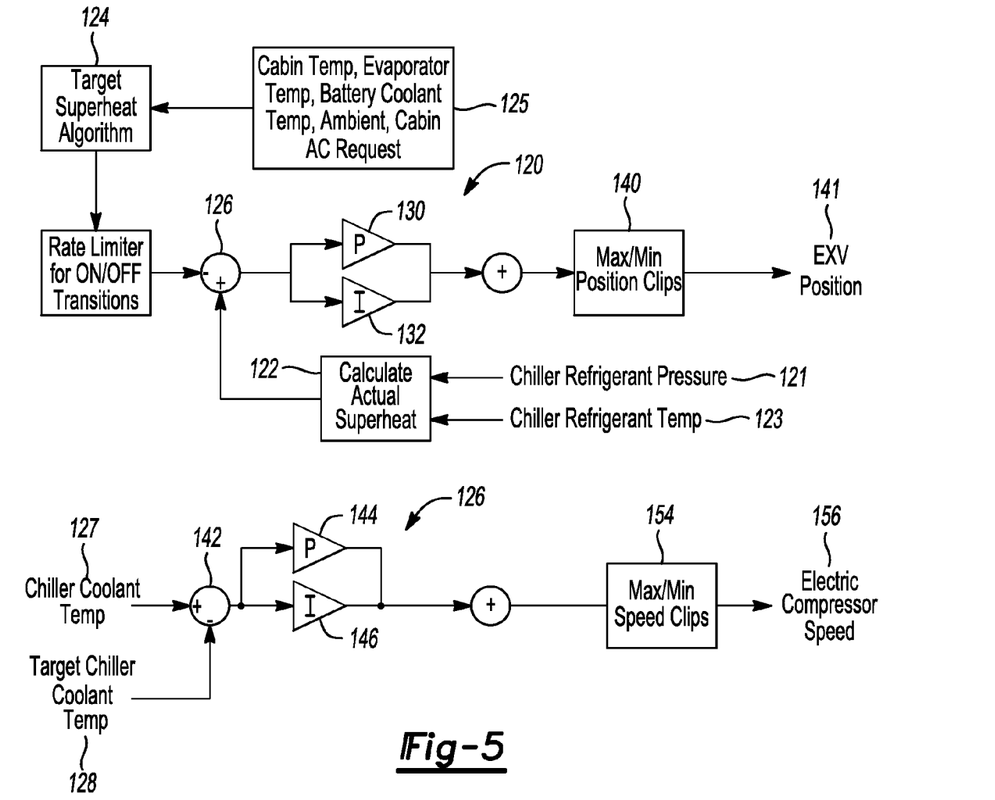
FIG. 5 is a control system diagram depicting operation of a chiller control mode.

FIG. 5 depicts an electronic expansion valve control system 120 and a compressor control system 126 to control the battery chiller when there is a demand for cooling by only the battery. Control system 120 monitors a measured superheat at 122 and a target superheat at 124 to output a second expansion valve position. Control system 126 again using the measured chiller temperature at 127 and the target chiller temperature at 128 to control the electric compressor speed.

Control system 120 calculates a target superheat at 124 and an actual superheat at 122. The actual superheat at 122 is calculated through inputs from the chiller refrigerant pressure at 121 and the chiller refrigerant temperature at 123. The target superheat is calculated through inputs such as a cabin temperature, an evaporator temperature, a battery coolant temperature, an ambient temperature, and a cabin cooling request, at 125. The target superheat at 124 is subtracted from the actual superheat at 122 at 126. The result at 126 is run through a proportional gain at 130, as well as an integral gain at 132. The proportional gain at 130 is consistent with a short-term response to the comparison of the actual superheat at 122 and the target superheat at 124. The integral gain at 132 is consistent with a long-term response to the comparison of the actual superheat at 122 and target superheat at 124. The minimum and maximum position values based on the PI control at 130, 132 are clipped at 140. Based on the value generated at 140 the second expansion valve control system 120 outputs a second expansion valve position at 141.

Control system 126 utilizes similar control strategy. The measured chiller coolant temperature 127 and the target chiller coolant temperature 128 are input into an adder at 142. They are compared using a proportional gain at 144 and an integral gain at 146 consistent with the PI control strategy discussed above. A maximum and minimum compressor speed clip at 154 outputs an electric compressor speed at 156 from the values of the PI control strategy at 144,146. Therefore, when there is a demand for cooling to the battery without a demand for cooling to the cabin, the compressor control system 126 sets the compressor speed at 156 to meet the demand for cooling at the chiller.

Figure 6:
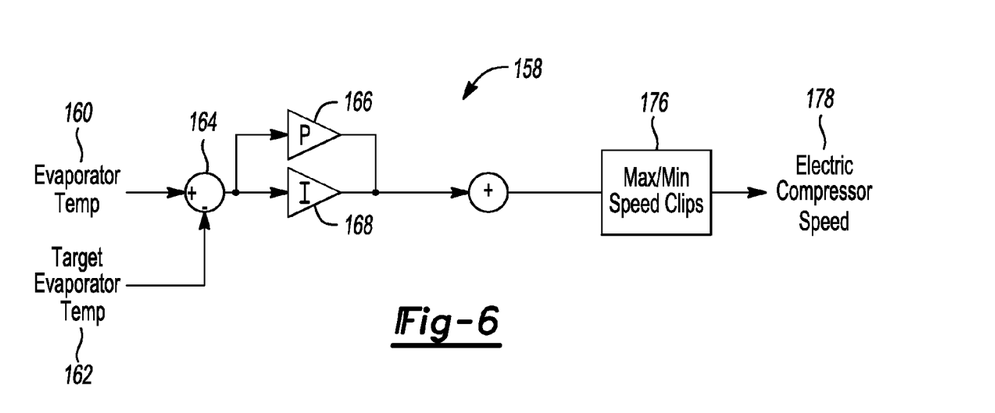
FIG. 6 is a control system diagram depicting operation of an evaporator control mode.

FIG. 6 depicts a compressor control system 158 when there is only a demand for cabin cooling. The compressor control system 158 uses an actual evaporator temperature at 160 and a target evaporator temperature 162. The actual evaporator temperature 160 and the target evaporator temperature at 162 are input into an adder at 164. The evaporator temperature values at 160 and 162 are compared using a proportional gain at 166 and an integral gain at 168. This is consistent with the PI control strategy discussed above. A maximum and minimum compressor speed clip at 176 outputs a compressor speed at 178. Using an actual evaporator temperature 160 and a target evaporator temperature 162, the compressor control system 158 outputs a compressor speed at 178 to meet the cooling demands of the cabin. When compressor control system 158 is being utilized, the electronic expansion valve to the chiller is closed.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A climate control system comprising:
   a first conduit and first valving arranged to selectively form a coolant circuit incorporating a chiller to cool a traction battery arrangement, and
   a second conduit and second valving arranged to selectively form a first refrigerant circuit incorporating the chiller and an evaporator or a second refrigerant circuit bypassing the chiller and incorporating the evaporator based on an activation state of the second valving, and
   a controller configured to,
   in response to a request for cabin cooling received while fluid is moving through at least one of the refrigerant circuits, adjust a speed of a compressor to change cabin cooling and alter the activation state of the second valving to change cooling of the traction battery arrangement, and
   in response to a superheat value of a refrigerant based on a pressure ratio in the first refrigerant circuit falling below a threshold value, alter the activation state of the second valving to maintain the superheat value at the threshold value, wherein the pressure ratio is calculated via first and second pressure sensors, the second pressure sensor being disposed between the compressor and a condenser.

2. The climate control system of claim 1, wherein the controller is further configured to, in response to a superheat value of a refrigerant in the first refrigerant circuit rising above a threshold value, alter the activation state of the second valving to maintain the superheat value at the threshold value.

3. The climate control system of claim 1, wherein the controller is further configured to, in response to a demand for cooling from the traction battery arrangement and a superheat value of a refrigerant in the first refrigerant circuit exceeding a threshold value, alter an activation state of the second valving and adjust a speed of the compressor to move refrigerant through the first refrigerant circuit.

4. The climate control system of claim 3, wherein the controller is further configured to, in response to a demand for cooling from the traction battery arrangement, alter an activation state of the first valving to move coolant through the coolant circuit.

5. The climate control system of claim 1, wherein the controller is further configured to, in response to a demand for cabin-only cooling, alter an activation state of the second valving to direct the refrigerant through the second refrigerant circuit and adjust a speed of the compressor to adjust a mass flow rate of the refrigerant moving through the second refrigerant circuit.

6. A climate control method for a vehicle comprising:
   altering a speed of a compressor and position of a valve based on a pressure and temperature of refrigerant output from a chiller to drive a temperature of refrigerant toward a superheat value, and change a coolant temperature, wherein the superheat value is based on a pressure ratio from first and second pressure sensors, the second pressure sensor being disposed between the compressor and a condenser.

7. The method of claim 6, further comprising altering a position of a second valve included within a coolant circuit to move coolant through the chiller while the compressor is moving refrigerant through the chiller.

8. The method of claim 6, further comprising altering a position of a second valve disposed within a coolant circuit and the position of the valve included within a refrigerant circuit having the compressor and an evaporator to move refrigerant through the refrigerant circuit, and altering the speed of the compressor to change evaporator cooling.

9. The method of claim 6, further comprising altering the position of the valve included within a refrigerant circuit having the compressor and an evaporator to move refrigerant through the refrigerant circuit, and altering the speed of the compressor to change chiller cooling.

10. A vehicle comprising:
    a coolant circuit including a chiller and battery arrangement;
    a refrigerant circuit including a compressor, valve, and evaporator; and a controller programmed to alter a speed of the compressor and a position of the valve to drive a temperature of refrigerant toward a superheat value based on a pressure ratio calculated via first and second pressure sensors, the second pressure sensor being disposed between the compressor and a condenser.

11. The vehicle of claim 10, wherein the controller is further programmed to alter a position of a second valve included within the coolant circuit to move coolant through the chiller while the compressor moves refrigerant through the chiller to change chiller and evaporator cooling.

12. The vehicle of claim 10, wherein the controller is further programmed to alter a position of a second valve included within the coolant circuit and a position of the valve included within the refrigerant circuit to move refrigerant through the refrigerant circuit, and alter the speed of the compressor to change evaporator cooling.

13. The vehicle of claim 10, wherein the controller is further programmed to alter a position of the valve included with the refrigerant circuit to move refrigerant through the refrigerant circuit, and adjust the speed of the compressor to change chiller cooling.

* * * * *